(12) United States Patent  
Terzis et al.

(10) Patent No.: US 8,341,653 B2
(45) Date of Patent: Dec. 25, 2012

(54) OPTICAL DISC STORAGE SYSTEM

(75) Inventors: Price Berrien Terzis, Los Altos Hills, CA (US); Artem Mishin, Pacifica, CA (US); Christopher Montgomery Carpenter, Sunnyvale, CA (US); Brian Hale Nelson, Fremont, CA (US); Craig Barker, San Carlos, CA (US)

(73) Assignee: Hitachi-LG Data Storage Korea, Inc. (KR)

( * ) Notice: Subject to any disclaimer, the term of this patent is extended or adjusted under 35 U.S.C. 154(b) by 282 days.

(21) Appl. No.: 12/776,060

(22) Filed: May 7, 2010

(65) Prior Publication Data

US 2010/0287576 A1 Nov. 11, 2010

Related U.S. Application Data

(60) Provisional application No. 61/176,704, filed on May 8, 2009.

(51) Int. Cl.
*G11B 15/68* (2006.01)
*G11B 17/22* (2006.01)

(52) U.S. Cl. .................... 720/615; 369/30.42; 369/30.49
(58) Field of Classification Search ................ 720/615; 369/30.42, 30.49, 30.53, 30.61; 360/92.1
See application file for complete search history.

(56) References Cited

U.S. PATENT DOCUMENTS

| | | | | |
|---|---|---|---|---|
| 4,599,716 A * | 7/1986 | Shimbo | ...................... | 369/30.59 |
| 4,855,980 A * | 8/1989 | Hug et al. | .................. | 369/30.49 |
| 4,928,245 A * | 5/1990 | Moy et al. | ..................... | 700/218 |
| 5,128,912 A * | 7/1992 | Hug et al. | .................. | 369/30.61 |
| 5,136,562 A * | 8/1992 | Staar | ........................... | 369/30.53 |
| 5,418,763 A * | 5/1995 | Ichikawa et al. | ................. | 369/84 |
| 5,432,656 A * | 7/1995 | Motoyama et al. | ............. | 360/69 |
| 5,454,485 A * | 10/1995 | Dalziel | ............ | 221/83 |
| 5,550,801 A * | 8/1996 | Enomoto et al. | ........... | 369/30.77 |
| 5,729,524 A * | 3/1998 | Pines et al. | ................. | 369/30.64 |
| 5,923,638 A * | 7/1999 | Watanabe | ...................... | 720/668 |
| 5,995,320 A * | 11/1999 | Ostwald | ...................... | 360/92.1 |
| 6,041,026 A * | 3/2000 | Hammar et al. | ........... | 369/30.43 |
| 6,115,206 A * | 9/2000 | Leggett | ........................ | 360/92.1 |
| 6,134,212 A * | 10/2000 | Pines et al. | .................. | 369/30.85 |
| 6,370,444 B1 * | 4/2002 | Kusunoki | ...................... | 700/214 |
| 6,587,405 B1 * | 7/2003 | Klein | ........................ | 369/30.59 |
| 6,590,841 B2 * | 7/2003 | Ostwald | ..................... | 369/30.48 |
| 2005/0152061 A1 * | 7/2005 | Hoelsaeter | ....................... | 360/92 |
| 2008/0278847 A1 * | 11/2008 | Barkley et al. | ............... | 360/92.1 |
| 2008/0288969 A1 * | 11/2008 | Waiman | ........................ | 720/615 |
| 2010/0321811 A1 * | 12/2010 | Goberis et al. | .................. | 360/31 |
| 2012/0117578 A1 | 5/2012 | Goyal et al. | | |

* cited by examiner

*Primary Examiner* — Brian Miller
(74) *Attorney, Agent, or Firm* — Birch, Stewart, Kolasch & Birch, LLP

(57) ABSTRACT

Embodiments provide methods and systems for handling optical discs in a media library appliance and for replacing optical drives in the field. In one embodiment, the media library appliance comprises optical disc handling robotics developed for slim form factor slot load drives in a vertical orientation located on both sides of the robotics within a 19 inch rackable appliance. On the system level, the optical disc storage system provides modularity and scalability. The drives reside in field replaceable units ("FRUs") that are oriented vertically on a horizontal backplane. The disc handling robotics access discs on each side stored in horizontal stacks within large disc cartridges. A small disc shuttle cartridge attaches to a large disc cartridge to provide a means to import and export a smaller number of discs from the disc cartridge.

17 Claims, 15 Drawing Sheets

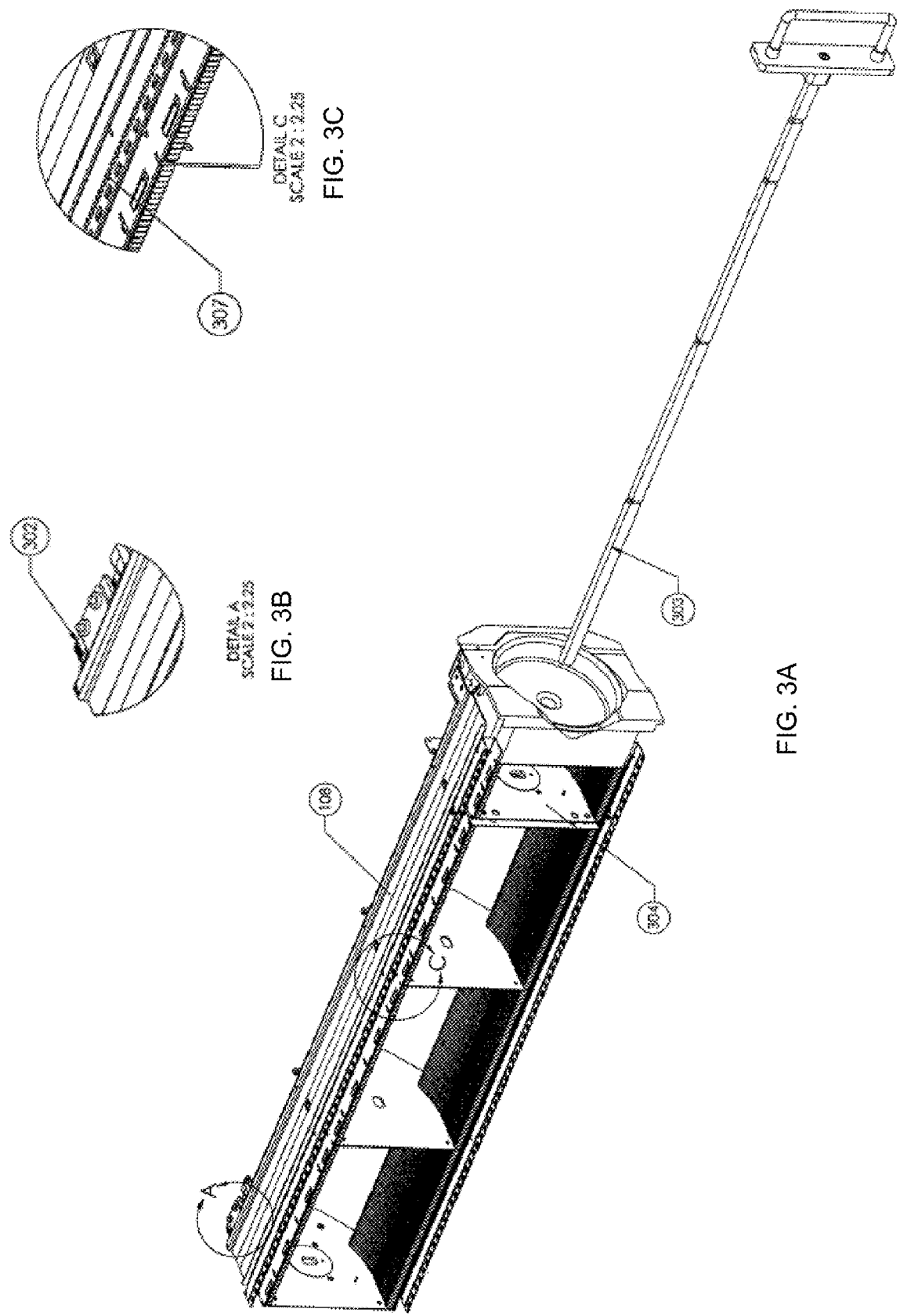

DETAIL B
SCALE 2 : 2.25

SECTION D-D
SCALE 2 : 1

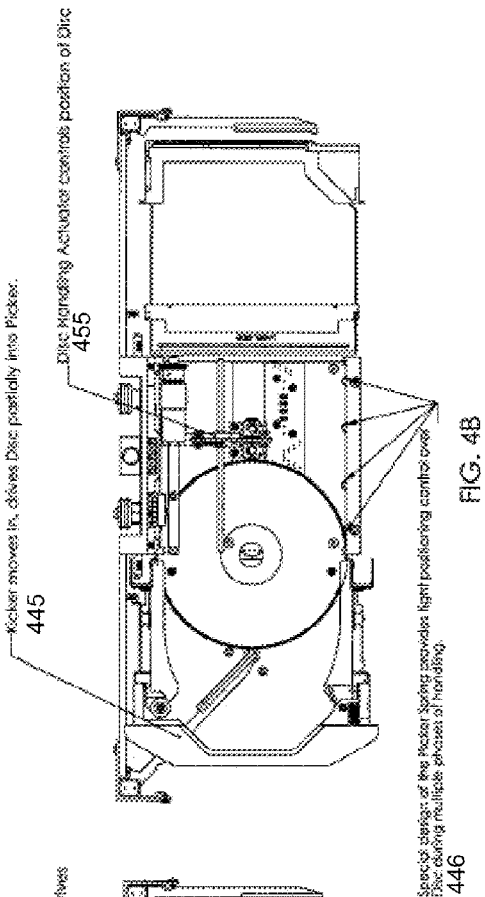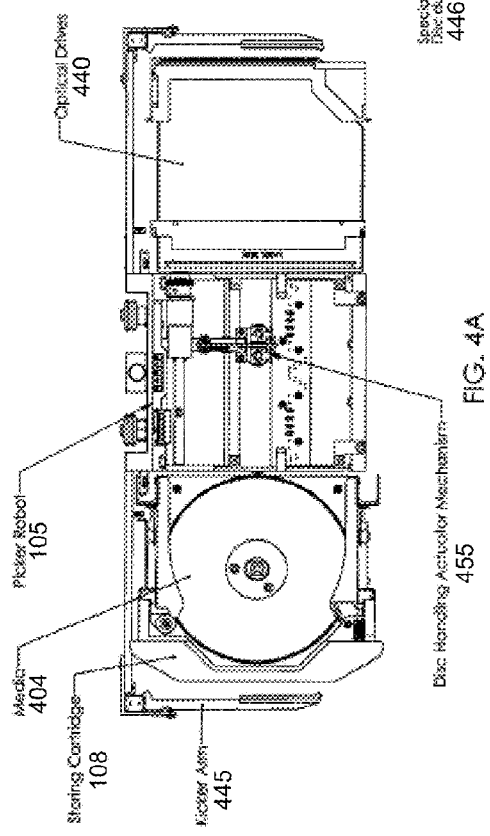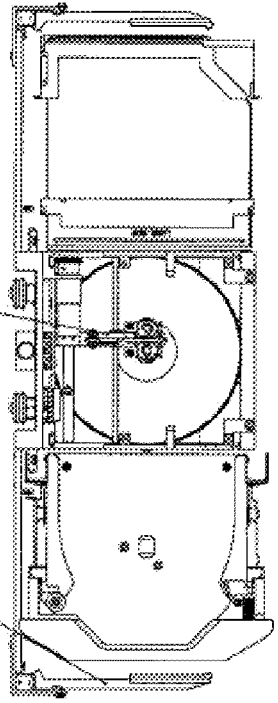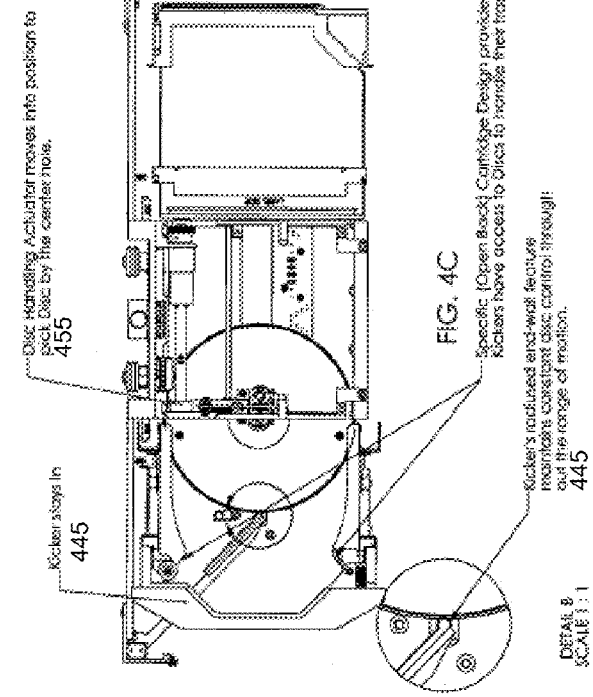

Encoder Panel, Transmitter and Receiver PCAs with Optics

OPTICAL DISC STORAGE SYSTEM

CROSS-REFERENCE TO RELATED APPLICATION

This application claims a benefit of, and priority under, 35 U.S.C. §119(e) to U.S. Provisional Patent Application Ser. No. 61/176,704, filed May 8, 2009, entitled "Optical Disc Storage System," which is incorporated herein by reference in its entirety.

BACKGROUND

1. Field of Art

This disclosure pertains in general to handling optical discs and replacement of disc drives in data storage systems.

2. Description of the Related Art

Various designs of optical disc libraries are known. For example, U.S. Pat. No. 4,984,228 to Agostini entitled "Dual Drive Changer for Records," issued Jan. 8, 1991, describes a system wherein an annular-shaped magazine for the storage of discs surrounds two disc drives. The magazine rotates relative to the disc drives, which allows dual mechanisms to load/unload the discs to/from the drives from/to the magazine.

BRIEF DESCRIPTION OF THE DRAWINGS

FIGS. 3A-G illustrate a high density disc cartridge used by the media library appliance, in accordance with one embodiment.

FIG. 4A-G illustrate loading a disc into an optical drive of a media library appliance, in accordance with one embodiment.

DETAILED DESCRIPTION

Configuration Overview

Embodiments disclosed provide methods and systems for handling optical discs in a media library appliance and for replacing optical drives in the field. In one embodiment, the media library appliance comprises optical disc handling robotics developed for slim form factor slot load drives in a vertical orientation. On the system level, the optical disc storage system provides modularity and scalability. Each pair of drives resides in a separate field replaceable unit ("FRU") that is oriented vertically on a horizontal backplane. The disc handling robotics comprise a disc picker assembly that accesses discs stored in a horizontal stack within a large disc cartridge by moving laterally along the length of the cartridge. A small disc shuttle cartridge attaches to the large disc cartridge to provide a means to import and export a smaller number of discs from the disc cartridge.

Use of the slim slot-load drives with the horizontally-oriented disc cartridge greatly enhances the mechanical layout of the design by decreasing the robot complexity and increasing the discs per drive. Given the constraints of a network rack environment (e.g., rack width is fixed, rack height is very expensive, and rack depth is paid for), orienting the disc stack to be horizontal is the most cost effective way to achieve large disc density. By a similar argument, the small width of slim drive form factor allows drives to be configured on each side of a center robot which achieves four times more drives than a half-height optical drive in the same library chassis. In one embodiment, this creates greater data throughput and more drives available to service more data requests.

In one embodiment, the layout also simplifies the robotics, which achieves savings in development time, down-time and parts cost. In various embodiments, all required disc movements are achieved with two independent axes: the pickers on a sled move discs from one side of the appliance to the other, and the sled positions the pickers from the front cartridge slots to the rear drive positions. Accordingly, no rotation of the discs or pickers is required.

The figures ("FIGS.") depict embodiments for purposes of illustration only. One skilled in the art will readily recognize from the following discussion that alternative embodiments of the structures and methods illustrated herein may be employed without departing from the principles described herein.

Media Library Appliance

Figure 1A:
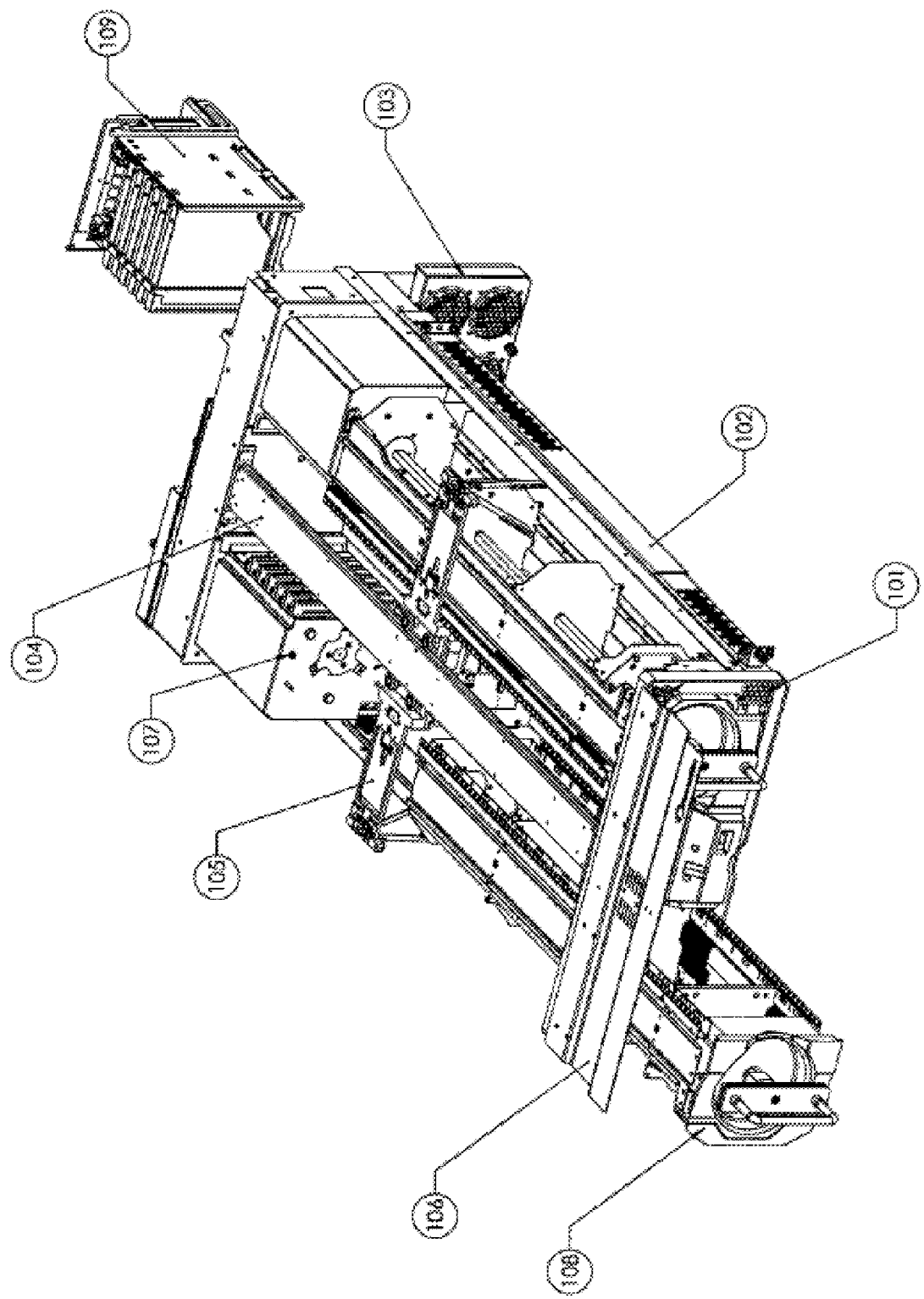
FIG. 1A illustrates an isometric view of a front side of the optical disc handling system of a media library appliance, in accordance with one embodiment.
Figure 1B:
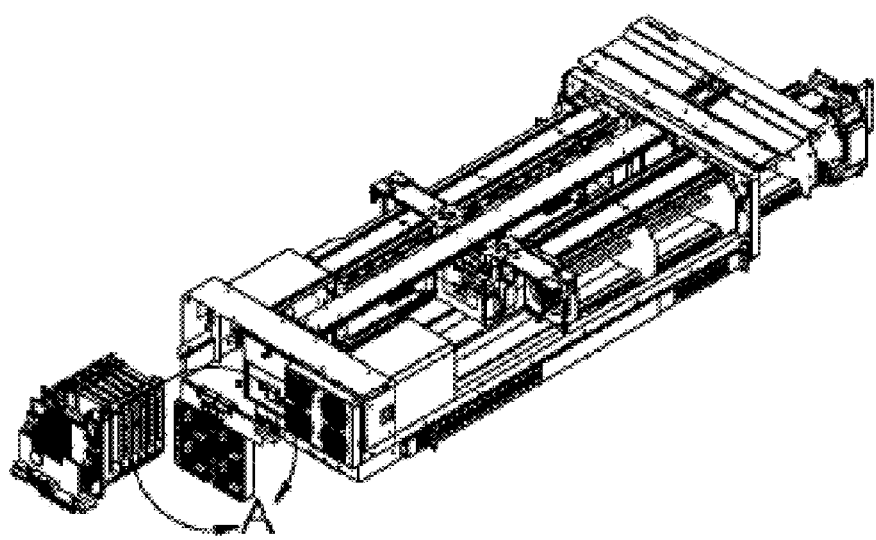
FIG. 1B illustrates an isometric view of a back side of the optical disc handling system of the media library appliance illustrated in FIG. 1A.
Figure 1C:
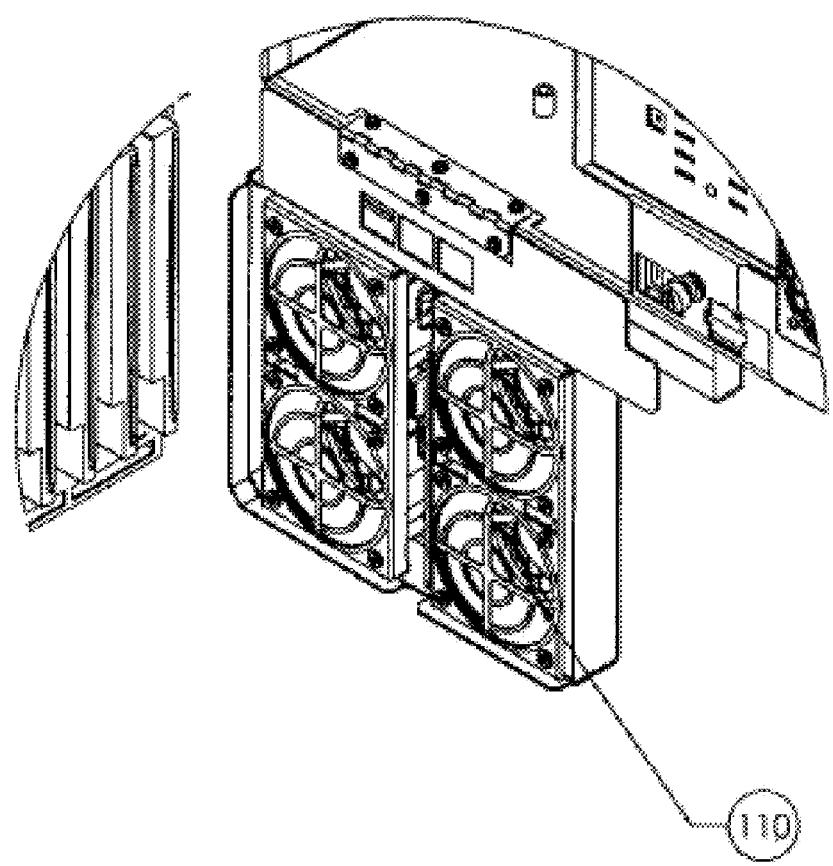
FIG. 1C illustrates a detailed view of fan field replaceable units built into a back door of the media library appliance illustrated in FIGS. 1A and 1B.
Figures 2A, 2B:
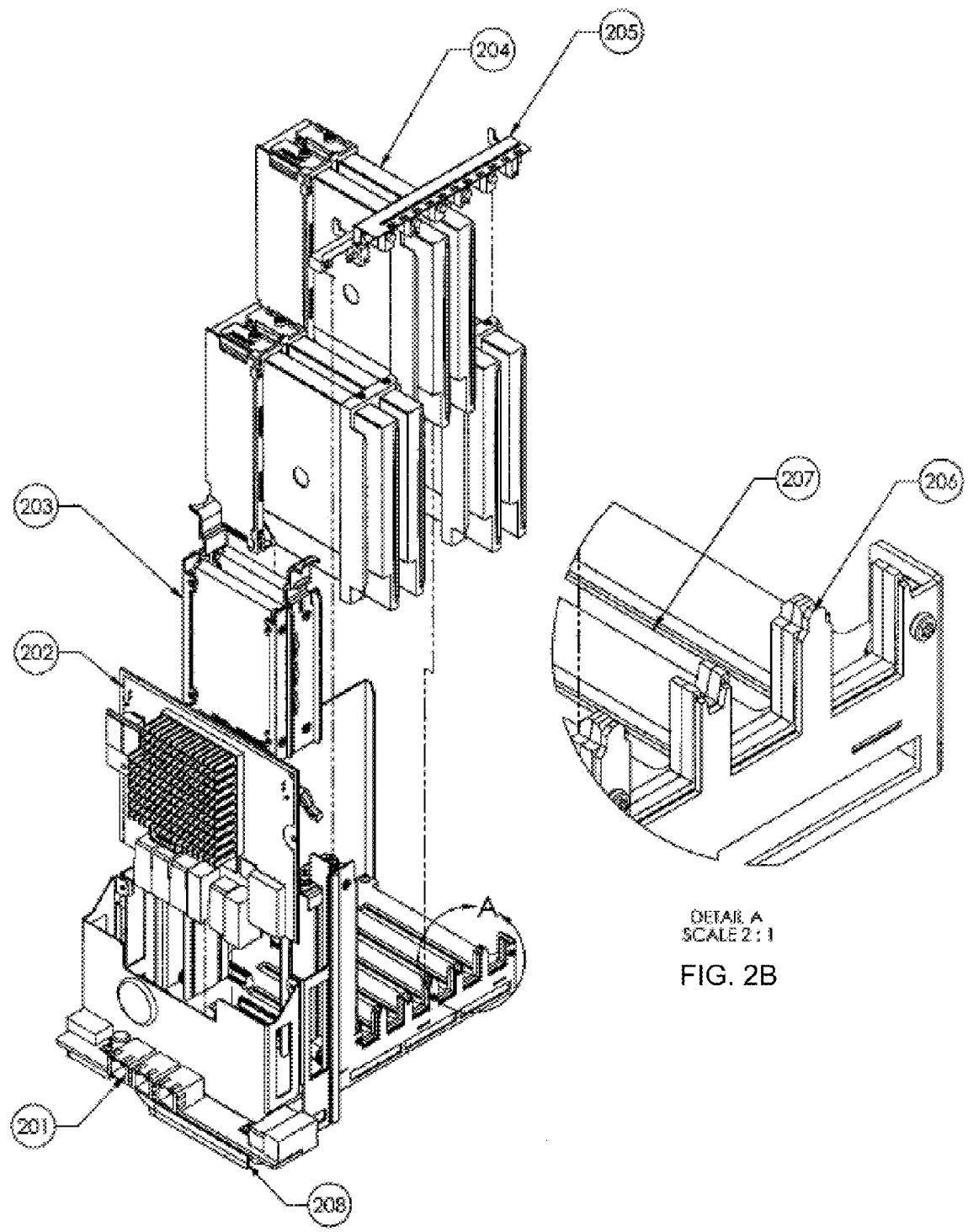
FIG. 2A-D illustrate field replaceable units ("FRUs") of the media library appliance, in accordance with one embodiment.
Figure 2C:
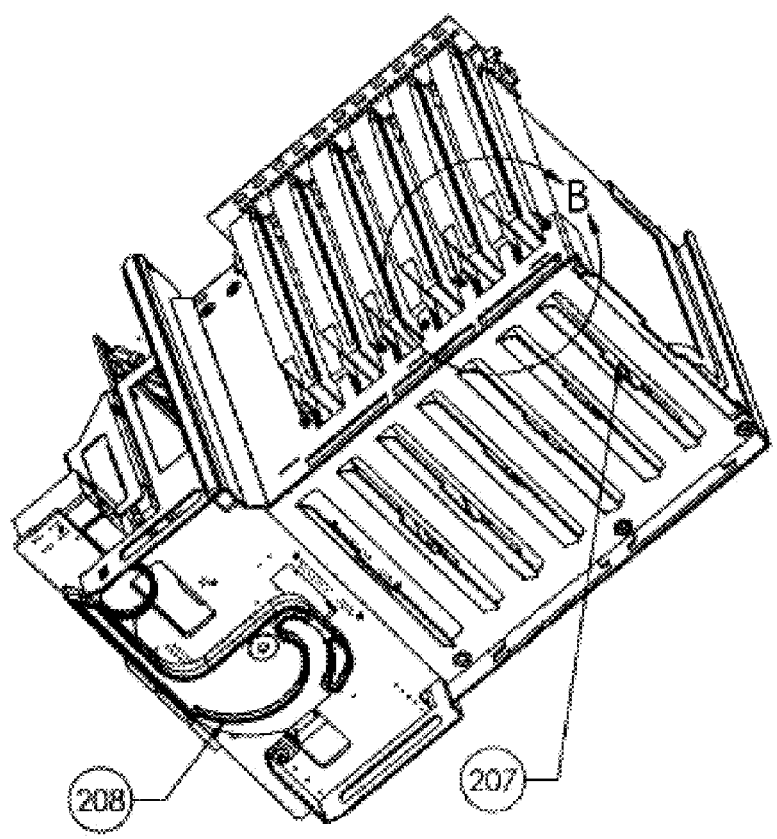
Figure 2D:
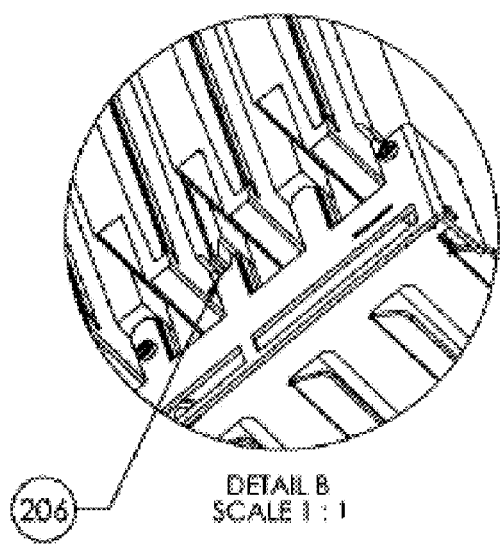

FIGS. 1A-C illustrates the optical disc handling system of a media library appliance, in accordance with one embodiment. In one implementation, the library is rack mountable in a standard 19 inch rack (~17.5 inch maximum appliance width), and the dimensions of the library are 4 rack mounted units ("RMU") high and 36 inches deep. The chassis 101 of the media library appliance is shown with the top cover removed to enable viewing of the interior components. In one embodiment, the chassis 101 includes a double floor construction to achieve structural rigidity and to divert cooling air around components of the media library appliance, including a picker 105, and disc cartridges 108. In one implementation, adjustable vented slide rails 102 are included to enable rack mounting and allow additional inlet for cooling purposes.

In addition to the chassis 101, the media library appliance shown in FIG. 1A-C also includes field replaceable unit ("FRU") access doors 103, fan FRUs 110, redundant front and rear disc handling assemblies referred to herein as "pickers" 105, a main slide rail 104, manufacturing adjusted hard stops 107 for precision rack alignment, a latching front door 106, disc cartridges 108, and a drive bay 109. Each of these components is further described below.

FIGS. 1A-C shows the field replaceable unit ("FRU") access doors 103 in the open position. Individual doors for each side allow service without requiring the media library appliance to power down. In some embodiments, the FRU access doors 103 also include fan FRUs 110. A fan FRU 110 allows for the easy replacement of a failed fan with minimal disruption of normal library operations. The fan FRU 110 as shown in FIGS. 1A-C contains two fans, but alternative implementation may include one or more. In one embodiment, the fan FRU 110 is accessed by opening a rear door, unplugging the latching connector and unsnapping the fan FRU 110 from the door. The replacement fan FRU 110 is installed using the reverse order of these operations. In one embodiment, this process can be done without powering off the media library appliance.

Also illustrated in FIG. 1A are the pickers 105, which are redundant front and rear disc handling assemblies. In one embodiment of the media library appliance, a main slide rail 104 provides a very low profile rail and lead screw assembly to drive the picker 105 front to back within the appliance, with sufficient structural rigidity, precision, and speed to handle discs in a 2.50 millimeter ("mm") disc pitch. A standard disc is 1.25 mm thick at the outer diameter. In one embodiment, to adequately position a disc for insertion into a cartridge requires alignment between the picker's slot and the cartridge slots to within plus or minus 0.30 mm of the centerline. In one implementation, the media library appliance also includes manufacturing adjustable hard stops 107 for precision rack alignment. The hard stops 107 work with the cartridge locks to ensure the cartridge slots and picker slots are parallel for smooth disc handling. A similar adjustable hard stop is part of the bulk cartridge 108 to allow adjustment of the shuttle cartridge, described below.

The media library appliance may also include a latching front door 106. The latching front door 106 provides a firmware-controlled access to both disc cartridges 108.

Also shown in FIG. 1A are disc cartridges 108 that have a 2.50 mm pitch bulk cartridge shown with an optional integrated shuttle cartridge installed. The disc cartridges 108 and shuttle cartridge are described in greater detail below.

The media library appliance also includes a drive bay 109. In this implementation, left and right FRU drive bays 109 allow for redundancy, performance, and serviceability. The field-replaceable electronics reside mostly in one of these bays, which can be removed and serviced without taking the media library appliance offline.

FIGS. 2A-D illustrate the field replaceable units ("FRUs") of the media library appliance, in accordance with one embodiment. The FRUs include multiple library interconnects 201 for redundancy and to enhance performance. A single board computer 202 is designed with a small form factor and blindmate interconnects to allow for easy serviceability and high performance of the attached multiple drives. In this example, a dual hard disc drive ("HDD") FRU 203 includes two drives in a single package to maximize packing density and thermal cooling while reducing or minimizing packaging costs. Also illustrated is a dual Optical Disc Drive ("ODD") FRU 204. Two optical drives in each FRU maximizes packing density and thermal cooling while reducing or minimizing the cost of the FRU components. Dual drive packaging also increases the vertical orientation stability while giving maximum redundancy. The FRU package design allows the FRU to be configured for installation in either the left or right drive bay 109 while compensating for vertical shift of the disc slot in the standard drive form factor. Above the dual ODD FRU 204 is a drive position encoder and stabilizer 205. Crenulations lock all of the FRUs together into a single, more stable block, which helps to ensure and preserve drive parallelism to the picker 105. Alternating ramps in the crenulations 206 center and compress the ODD FRUs 204 together.

The FRU assembly enables the media library appliance to maintain compatibility with double-sided media. Current single-sided media means that all discs in the library are oriented in a single direction; e.g., the label side faces the front and data side faces the back of the library. Within an ODD FRU assembly, the drives can position in opposite orientations such that field replacement of a set where both drives face the same direction with a set where the drives face opposite directions allow the media library appliance to easily be updated to support media that has data on both sides without the need for adding mechanisms to flip the discs to orient the required data side towards the optical pickup unit of the respective drive.

The single board computer ("SBC") 202 has a processor, memory, an operating system, custom application code and hardware, and it is used to command/control other hardware within the library. In one embodiment, the SBC 202 communicates with a system server computer via Gigabit Ethernet ("GigE"). It receives command, control, and data information via GigE and translates that information into work tasks within the library, such as moving disc, communicating with drives, interacting with customers and providing feedback to the server. A process on each SBC 202 will control the optical drives and the robotics, including the picker 105. The SBC 202 processes requests for data access and storage, and directs the robotics to select and load the appropriate discs into the appropriate drives. The operations of the SBC 202 will be described in further detail with regard to the replacement of FRUs below.

The media library appliance includes an integrated air cooling system. The system prevents air being pulled past discs, and reduces the total dust in the system. The air flow moves from the electrical system that is hermetically isolated from the disc storage and handling systems. A vented backplane and carrier 207 allows cooling air to come into the library horizontally and is turned vertically by deflectors in the sheet metal carrier to go up through vents in the backplane. This allows for the drives to be packed closely together in a vertical orientation without over heating. Vertical orientation of the drive is critical to support the high density of the vertical disc orientation (e.g., in the linear horizontal disc stack) in the disc cartridge 108.

FIG. 2 also illustrates a single ejector/injector and blindmate connection 208 to remove the entire drive bay 109. This feature facilitates the fast and easy unload and reload of an entire FRU component assembly. When an auxiliary drive bay is used, repair time can be reduced or minimized because the technician can do the replacement of a FRU compartment after full library functionality has been restored.

FIGS. 3A-G illustrate a high density disc cartridge 108 used by the media library appliance, in accordance with one embodiment. As discussed above, the bulk cartridge 108 carries 225 discs at a 2.5 mm pitch for the bare discs, plus 25 more disks in the integrated shuttle cartridge 304.

In one embodiment, the bulk cartridge includes a bulk cartridge flash 302 illustrated in FIG. 3B, which in one embodiment is 4 MB or more and is used to carry metadata about the discs in the cartridge 108. This enables a cartridge to be moved to a new location without having to re-inventory the cartridge 108. In one implementation, the cartridge flash 302 contains a manifest that details what is in each slot of the cartridge, complete with a volume ID for each disc and a short history of the disc including rewrite counts for BD-RE and error counts. The contents of a cartridge are assumed to match the manifest written to the cartridge flash 302. If the system discovers an empty slot where a disc was expected, a disc present where an empty slot was expected, or an unexpected volume found in a slot, the software will perform a complete inventory of the cartridge. The end result will be the update of internal databases and/or the cartridge manifest stored in the cartridge flash 302.

A bulk cartridge key rod 303 is used to lock and unlock cartridges to the library. When the cartridge is outside of the library, the key rod 303 serves to lock the discs in to the cartridge and it is used to carry the cartridge. The key rod 303 runs through the center hole of the discs inside the cartridge 108.

Figure 3D:
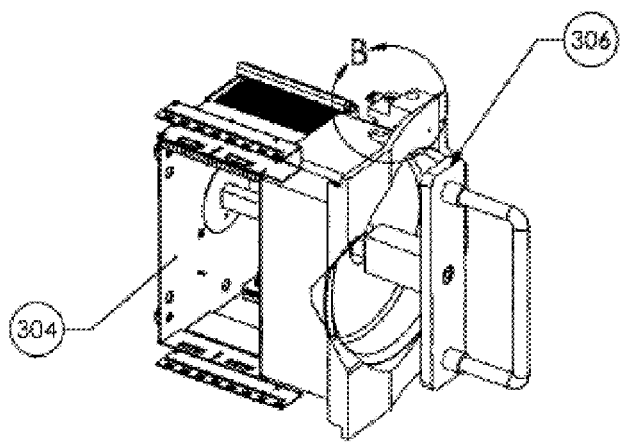
Figure 3E:
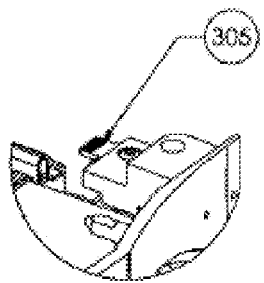

The shuttle cartridge 304 is an integrated, removable cartridge that allows easy import/export of up to 25 discs. The shuttle 304 is designed to slide in and lock to the bulk cartridge 108 to increase the bulk capacity to 250 discs. The shuttle cartridge 304 also carries a shuttle cartridge flash 305 as shown in FIG. 3E, which in one embodiment is 4 MB or more and which contains metadata about the discs in the shuttle cartridge 304. This allows the cartridge inventory data to be updated to a new library quickly without having to mount each disc individually. The shuttle cartridge 304 also includes a key rod 306 which is used to lock and unlock the shuttle cartridge to the bulk cartridge 108. When the shuttle cartridge 304 is outside of the library, the key rod 306 serves the lock the discs in to the shuttle cartridge 304 and it is used to carry the cartridge 304. The shuttle cartridge 304 has many possible uses. For example, the shuttle cartridge 304 can be used to import new discs to replace those in the bulk cartridge 108 that have failed, or export a group of discs from the bulk cartridge 108 comprising a replica to be stored in a separate library or other location.

The bulk cartridge 108 and the shuttle cartridge 304 also include a quadrature encoder 307. The encoder allows the picker to position itself relative to a disc slot by a closed-loop control system. The slot and tab construction of the metal cartridge frame and the plastic disc racks enables the precision for this positions system to work properly. Additionally, a cartridge calibration method is employed to measure an offset of individual bays of a cartridge. The calibration values are stored in the cartridge flash 302. A similar calibration can be done on the pickers and the offset values can be stored in memory on the sled. The ability to measure and store calibration values significantly increases the manufacturability of the cartridges and overall reliability of the library operation.

Figure 3F:
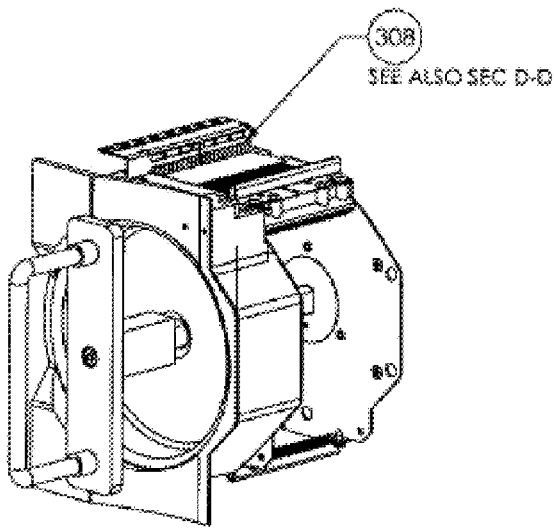
Figure 3G:
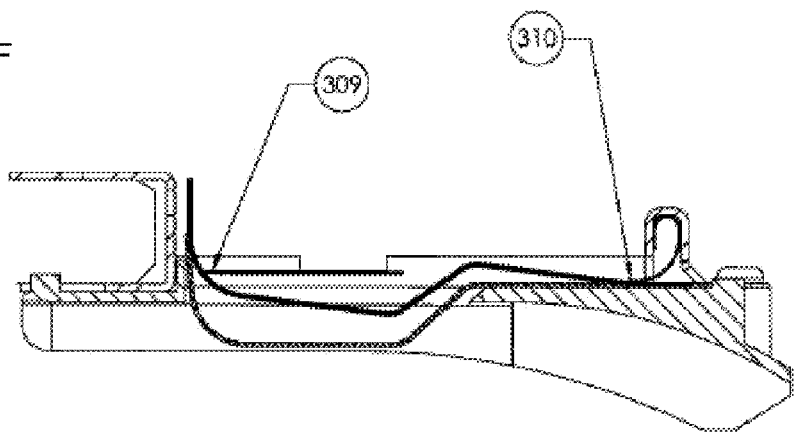

The bulk cartridge 108 and the shuttle cartridge 304 also include disc present flags 308 shown in FIG. 3F. The presence of a disc in a slot displaces the flag corresponding to the slot so that it can be detected by sensors on the picker 105. The detection by sensors on the picker 105 of the discs present in the bulk cartridge 108 and shuttle cartridge 304 improves reliability by adding hardware redundancy to a software map of where discs are in the library at any given time. As shown in FIG. 3G, a spring limiter 309 sets the spring finger in position for the flag to trigger the disc present sensor by optical or other means. The deflection limitation of the disc retention spring prevents interference between the removable cartridge 108 and the library chassis 101 or other moving parts. The spring return 310 is a compression spring such as an elastomer or leaf spring used in the bulk cartridge 108 or shuttle cartridge 304. The spring return 310 assists the disc retention spring and ensures retraction of a low-strength spring to the original position when a disc is not present.

In one embodiment, disc presence is determined by use of an optical disc edge detector integrated into the sled pickers. This type of disc presence detection reduces the complexity requirements in the cartridge spring design.

Disc Handling

FIG. 4A-4H illustrate loading a disc 404 into an optical drive 440 of a media library appliance, in accordance with one embodiment. In one embodiment, the library can swap a disc 404 out of a drive 440 and reload that drive 440 with a different disc within 10 seconds. A disc transfer assembly, referred to herein as a "picker" or "picker robot" 105 is positioned to transfer individual optical discs from the cartridge 108 to the drive 440 during the disc loading operation, and from the drive 440 to the cartridge 108 in the disc unloading operation. The discs can be loaded and unloaded from the bulk cartridge 108, as described above, using the shuttle cartridge 304.

FIG. 4A shows the initial position of a kicker arm 445, a media disc 404, the disc handling actuator mechanism 455 and the picker robot 105 with respect to the cartridge 108 and the optical drives 440. In the example shown, the kicker arm 445 operates by hinging forward. In other embodiments, the kicker arm 445 may be articulated in various other ways. For example, the kicker arm 445 may have cam action for sliding the disc 404 into the drive 440. Referring to FIG. 4A, the kicker arm 445 is at rest in the position furthest from the optical drives 440, and the disc 404 is resting in the cartridge 108, in preparation for the transfer of the disc 404 from the cartridge 108 to the optical drive 440.

FIG. 4B illustrates the position of the kicker arm 445, the disc 404, and the disc handling actuator 455 in the middle of loading the disc 404 to the picker 105. In this example, the kicker arm 445 hinges forward with enough force to roll or slide the disc from the cartridge 108 partially into the picker 105. Critically positioned springs 446 in the disc track maintain disc control during various transitions in the disc handling procedures; e.g., while moving the disc from the cartridge 108 to the picker 105, the springs 446 prevent the disc from rolling through the picker 105 while the disc handling actuator 455 is in the process of trying to grab the center of the disc 404.

FIG. 4C illustrates the position of the kicker arm 445, the disc 404 and the disc handling actuator 455 at the point the disc handling actuator 455 moves into position to engage the disc 404 by the center hole. The components of the cartridge 108 and picker robot 105 do not contact the disc 404 except for the disc edge and the center hole to avoid damage to the disc 404 in areas that may result in data loss. The kicker 445 stays in the hinged forward position to stabilize the disc 404 until the disc handling actuator 455 has engaged the disc 404. In one embodiment, the cartridge 108 has an open back design, having a very large gap in the back of the cartridge disc rack, allowing the kicker 445 sufficient penetration to push the disc 404 into the picker 105. Also shown in the detailed pullout view in FIG. 4C is the kicker's radiused end-wall feature. The kicker's disc guide features extend around the tip of the kicker 445, maintaining disc control throughout the range of motion of the kicker 445.

FIG. 4D illustrates the position of the kicker arm 445, the disc 404, and the disc handling actuator 455 as the disc 404 is at rest in the picker's 105 center. The kicker arm 445 has returned back to the resting position. The disc 404 has been loaded to the picker 105, and the picker 105 can subsequently transport the disc 404 to any location within the appliance. For example, in some embodiments, the picker 105 is used to move discs 404 to any drive in the library; move the discs within a cartridge 108, between different cartridges in the library and between different drives, such as drives oriented in different directions to allow for double-sided media. In this implementation, the picker 105 slides laterally with respect to the cartridges 108 and drives 440. In other variations, the cartridges 108 and/or drives 440 may slide laterally with respect to a stationary picker 105.

Figure 4F:
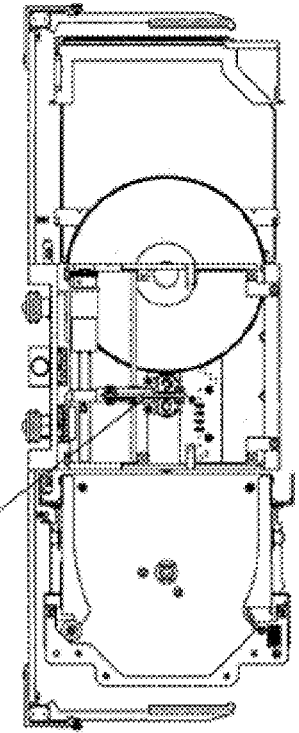
Figure 4H:
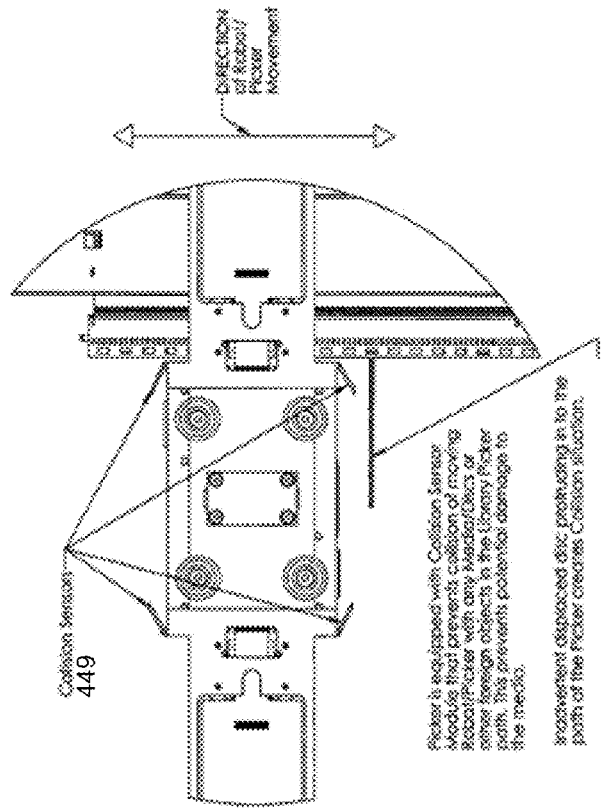
FIG. 4H illustrates a collision sensor module of the media library appliance, in accordance with one embodiment.
Figure 4E:
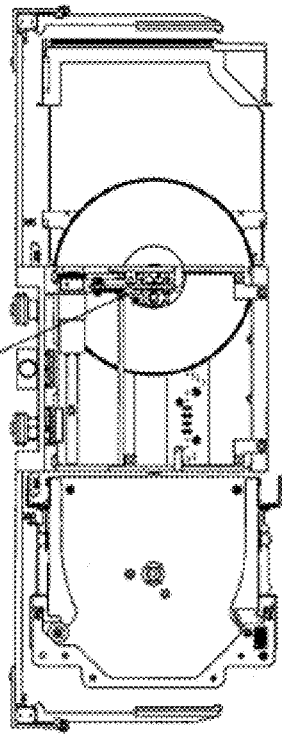
Figure 4G:
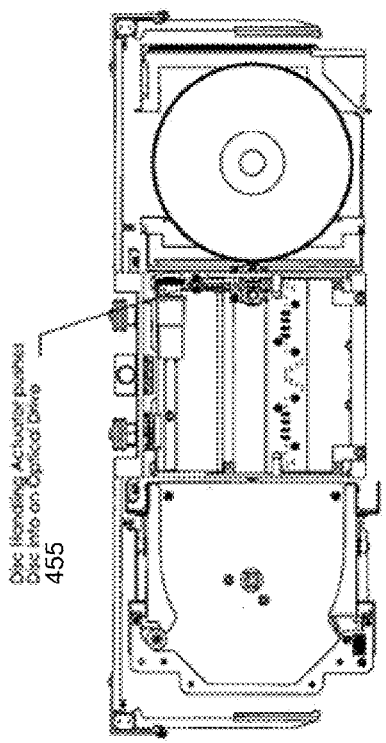

FIG. 4E illustrates the position of the disc handling actuator 455 and the disc 404 as the disc 404 is moved into the optical drive 440. FIG. 4F illustrates the disc handling actuator 455 that moves behind the disc 404 to push on the edge of the disc 404 and finish the insertion of the disc 404 into the optical drive 440. FIG. 4G illustrates the position of the disc handling actuator 455 at the completion of the disc insertion into the optical drive 440.

FIG. 4H illustrates the collision sensor module of the picker. The collision sensor module prevents collision of a moving robot/picker 105 with any media or discs or other foreign objects in the picker's 105 path. For example, an inadvertent displaced disc protruding into the path of the picker 105 creates a collision situation that that is sensed by one or more collision sensors 449. The collision sensor module quickly stops the picker positioning motor, thus stopping the motion of the robot/picker 105 before the disc is damaged by the robot/picker's motion. This prevents potential damage to the data stored on the disc media. In one embodiment, optical sensors are used as collision sensors 449, whereas in other embodiments contact sensors or other types of sensors for detecting the presence of objects are used in the collision sensor module.

During the unloading process, the disc 404 is ejected from the drive 440 into the picker 105, and the disc handling actuator 455 positions the disc 404 into the center of the picker 105. Once the picker 105 is aligned with the location of the storage slot for the disc within the cartridge 108, the disc handling actuator 455 loads the disc 404 into the cartridge 108, using similar motions as were used to load the disc 404 into a drive 440, but in the reverse direction.

Field-Replacement of Units

Components of the described media library appliance are field-replaceable, which results in the appliance having less total downtime. Each field-replaceable component has a specific swap type. The swap type is the mode that the hardware is in when the swap occurs. For cold swaps, the unit is completely powered down. A cold swap can have extended disruption of service. The down time for a cold FRU is the swap time plus library boot time plus any recalibration and quality check time. For warm swaps, the unit is mostly in a maintenance mode while the components being swapped are powered off. When the components have been swapped, the port of the hardware in maintenance mode can quickly restart and begin providing service. The service interruption with a warm swap is of limited duration, for example, half an hour of down time for a warm swap. For a hot swap, the unit is up and running with full power when these components are swapped. There is no interruption of service for hot swaps. In one embodiment, the library includes an HDD made of two discs, three ODDs made of two optical drives each, a bulk cartridge, and a shuttle cartridge that can all be warm swapped.

In one embodiment, the computing environment in which the media library appliance operates includes a server. The server includes a database for storing information associated with the maintenance and status of the media library appliance. In one embodiment, all hardware failures are tracked in a database. Thus, the server can track when a component of the media library appliance needs to be replaced. The following section describes a FRU flow for a media library appliance with a server, in accordance with one embodiment but variations of the flow are also contemplated. This flow assumes that the library is powered up and connected to a server. It also assumes there is no communication mechanism between the two SBCs 202 meaning that shutdown is synchronized between the two SBCs on the server. In one embodiment, a flow comprises:

1. The FRU process is initiated via a graphical user interface ("GUI") to bring the hardware down to the appropriate swap mode.
2. The server tells the SBCs to transition to offline mode.
3. The SBCs allow existing burn and read jobs to complete. All discs in drives are returned to a cartridge slot.
4. The specs notify the server when it has reached Offline mode.
5. The server tells the SBCs to transition to maintenance mode.
6. The SBCs tell the robotics to move to the safe zone. They will no longer accept disc movement commands, perform disc reads or burns.
7. The SBCs notify the server they are in Maintenance mode.
8. The GUI notifies the user that he can now press the door button.
9. The user presses the door button.
10. The robotics sets the door light to a first color.
11. The SBC notifies the server that the button has been pressed.
12. The server tells the SBCs to set the door button to a second color.
13. The user presses the button a second time.
14. The robotics sets the door light to a third color.
15. The SBC notifies the server that the user has pressed the button a second time.
16. The server tells the SBC to perform the following semi-automatically. This is done via a hardware API call:
    a. Potentially power down an SBC.
    b. Potentially unlock a hatch.
    c. Change the door light to a fourth color.
17. The user opens the door.
18. The user performs the FRU operation.
19. The user closes the door.
20. The user tells the server the FRU operation is complete via the GUI.
21. If the library is powered down the GUI tells the user to power up the library. If the library is in warm swap mode it notifies the SBC in maintenance mode to potentially power up a sibling.
22. As part of the normal state transitions, the library will check hardware inventory and drop into offline mode. This includes latching doors and setting button lights back to an initial condition.
23. The server will then decide how to continue the FRU operation. If nothing more needs to be done for a particular SBC, and there are no discovered issues with robotics or media, the SBC can be transitioned to an online state. Alternatively, the SBC may begin a quality check of a new optical drive. This may result in beginning a new FRU cycle.

In one embodiment, the FRU operation is completed with a server. In one implementation, the media library appliance is powered off to perform the FRU process.

Disc Defection System

Figure 5A:
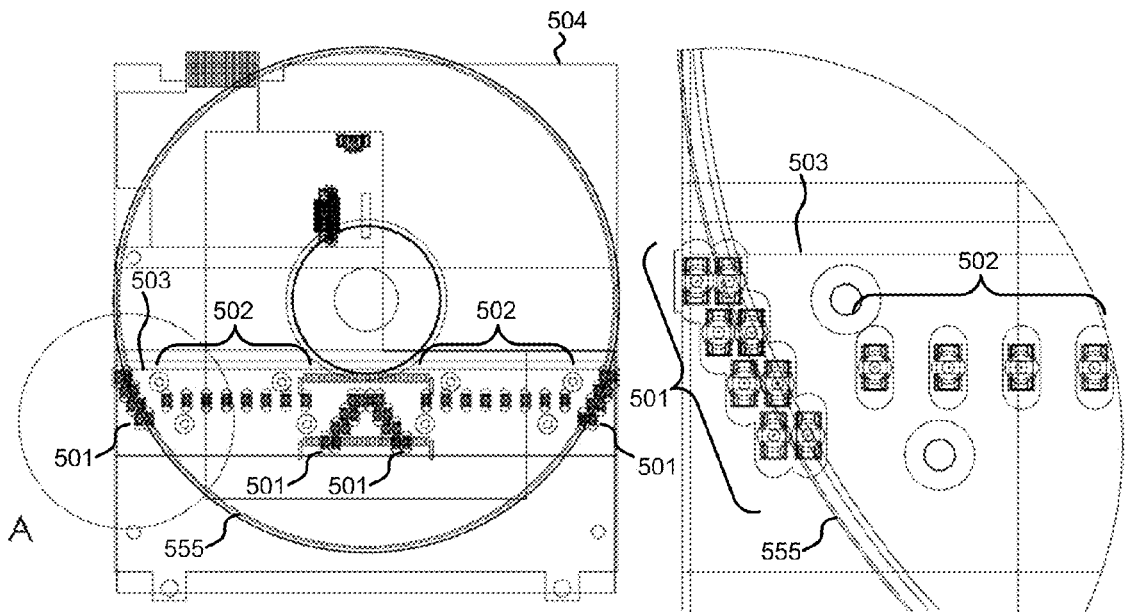
FIGS. 5A-C illustrate views of a disc detection system, in accordance with an embodiment.
Figure 5B:
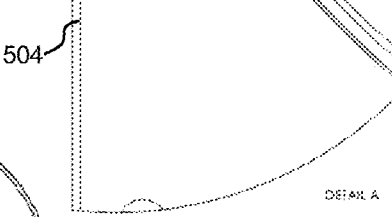
Figure 5C:
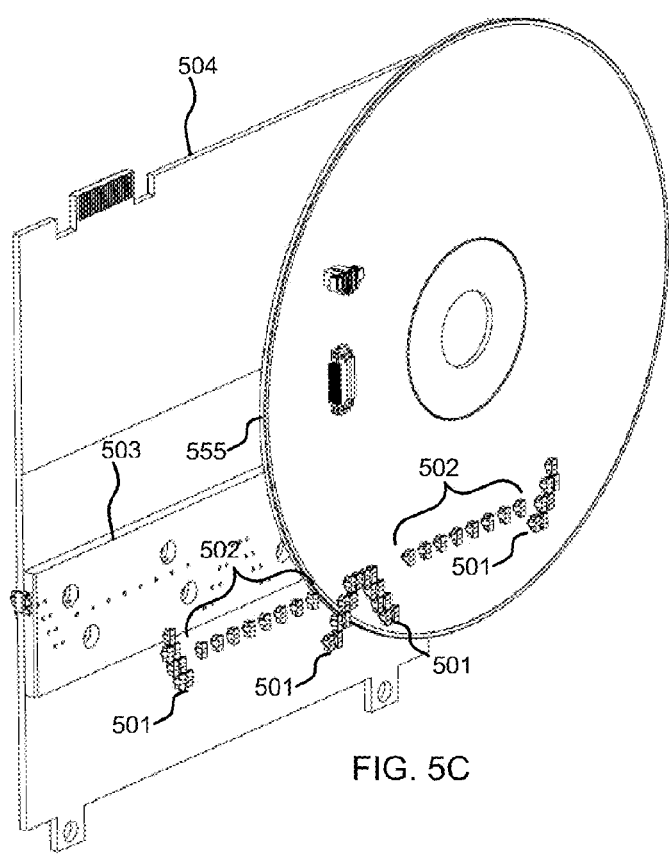

FIGS. 5A-C illustrate views of one embodiment of a disc detection system within the pickers. Arc arrays 501 of phototransistors and, for example, infrared light emitting diode ("IR LED") transmitters are positioned to detect disc edge 555 positions. The arrays 501 are designed such that the arc of the detection array 501 crosses the arc of the disc edge 555. In one embodiment, when the disc is in the correct position, for example, correctly in the picker 105, half of the phototransistors are on and half are off. The crossing arcs provide a differential and redundant detection capability. The arrangement provides a high resolution edge detection capability for accurate disc positioning. Linear arrays 502 of phototransistors and, for example, IR LED transmitters are arranged to detect gross disc locations by detecting gross edge 555 positions. Some of the phototransistors are on and some are off when the disc linear array is in use. This arrangement provides a lower-resolution and lower-cost disc position detection capability. A light shield 503 protecting the phototransistors reduces IR LED crosstalk from multiple transmitters and multiple angles to a line of sight perpendicular to the dagger board PCB surface 504. The light shield 503 results in greater detector accuracy. Alternatively or additionally, the IR LED arrays can be modulated in brightness to reduce crosstalk, improve resolution, extend life, and save power.

Picker Positioning System

Figure 6:
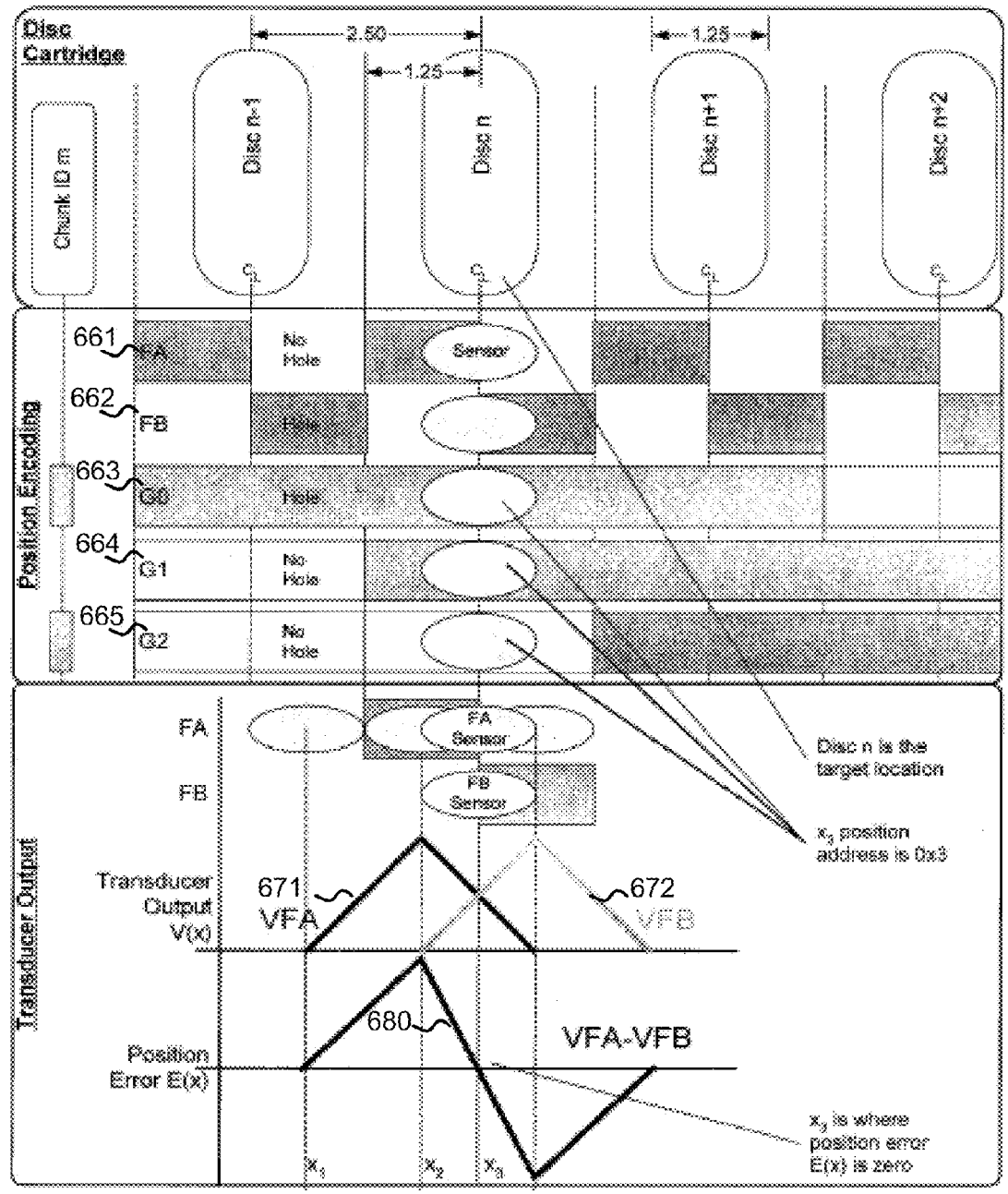
FIG. 6 illustrates disc slots versus gross and fine position coding with sensor outputs, in accordance with one embodiment.

FIG. 6 illustrates an example embodiment of disc slots versus gross and fine position coding with sensor outputs. In the embodiment illustrated in FIG. 6, two phototransistors are used as fine positioning sensors, FA 661 and FB 662. The system balances the sensor outputs VFA 671 against VFB 672 corresponding to sensors FA 661 and FB 662, respectively, to find the optimal position of sled on which the picker 105 is mounted that slides along the length of the library chassis 101. The balancing of two inverted sensor signals gives a linearized position error signal 680 that provides a predictable slope for a closed-loop positioning system. The balancing provides error rejection and error cancellation. The two fine positioning sensors provide a predictable repeated positioning coding reference for system positioning. In one embodiment, two or three phototransistors can be used as coarse positioning sensors G0 663, G1 664, and G2 665. The system reads the digital output of the sensors G0 663, G1 664, and G2 665 to decode a sled location address. Each sensor is one bit of information. The coarse positioning sensors are positioned to provide a gray code for digital data error rejection.

Figure 7:
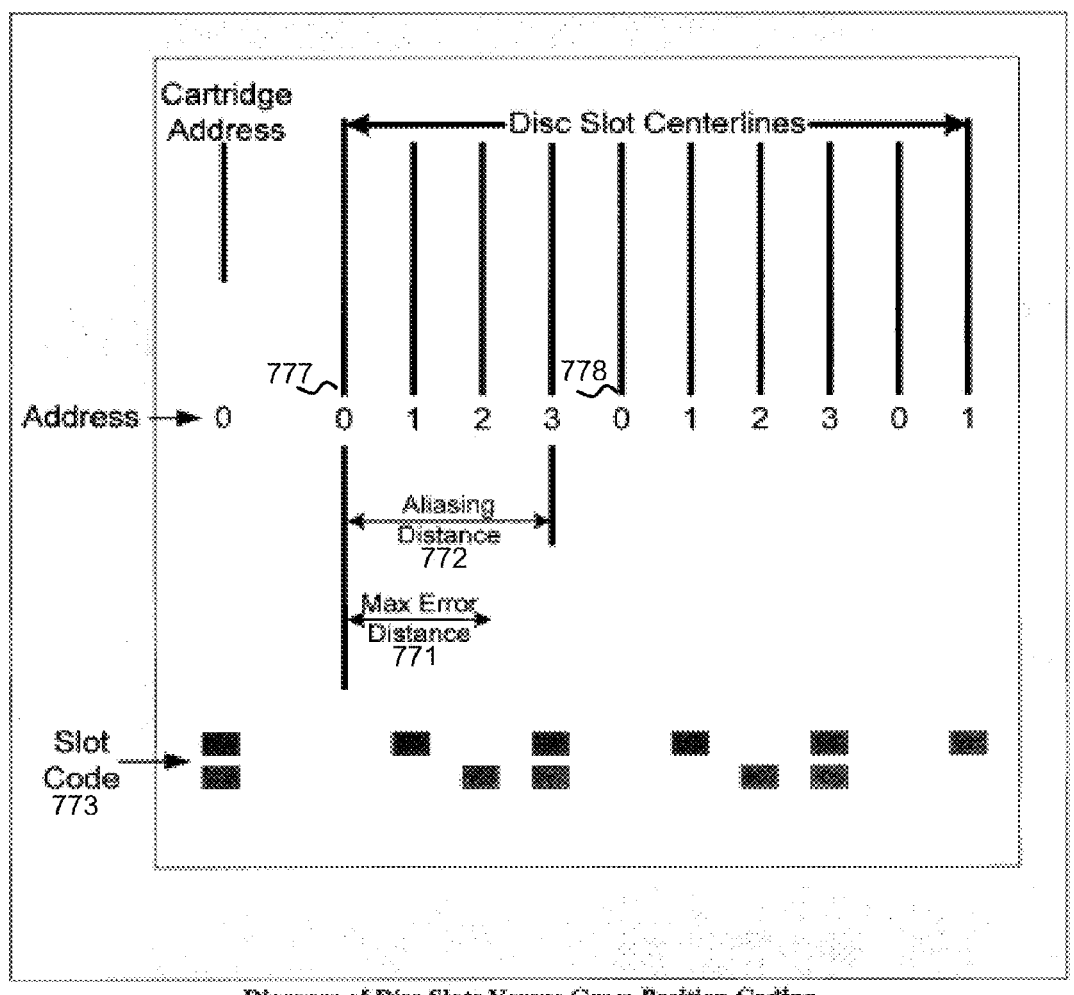
FIG. 7 is a diagram illustrating the disc slots versus gross position coding, in accordance with one embodiment.

FIG. 7 is a diagram illustrating the disc slots versus gross position coding, in accordance with one embodiment. The encoder panel space is limited. The total space allocated to the coarse bits encoder panel space is reduced by calculating an expected maximum error distance 771 due to errors associated with sled seeks. Then, the minimum number of coarse positioning sensors (Gn), each containing one bit of information, can be selected to reduce the total space required by the coarse positioning sensor optics and to reduce the space required by the encoder panel pattern. However, the minimum number of coarse positioning sensors must still provide a minimum aliasing distance 772 that is longer than the maximum error distance 771. The aliasing distance 772 is the distance before the code begins to repeat. If the maximum error distance 771 were allowed to exceed the aliasing distance 772, (e.g., if the maximum error distance 771 were twice as long as the distance shown in FIG. 7), it would not be possible to definitively determine the position of the sled from all codes. This is because, for example, the code would be the same for a sled aligned with the disc slot center line marked as 777 as when the sled is aligned with the disc slot center line marked as 778. Thus, without a narrow enough maximum error distance 771 to eliminate one of 777 and 778 as an option, an ambiguity in the sled position would remain. The coding shown in "Slot Code" 773 in FIG. 7 is merely an example. Alternatively, the coding can be whatever coding provides error rejection. In one embodiment, a gray code is used.

Figure 8:
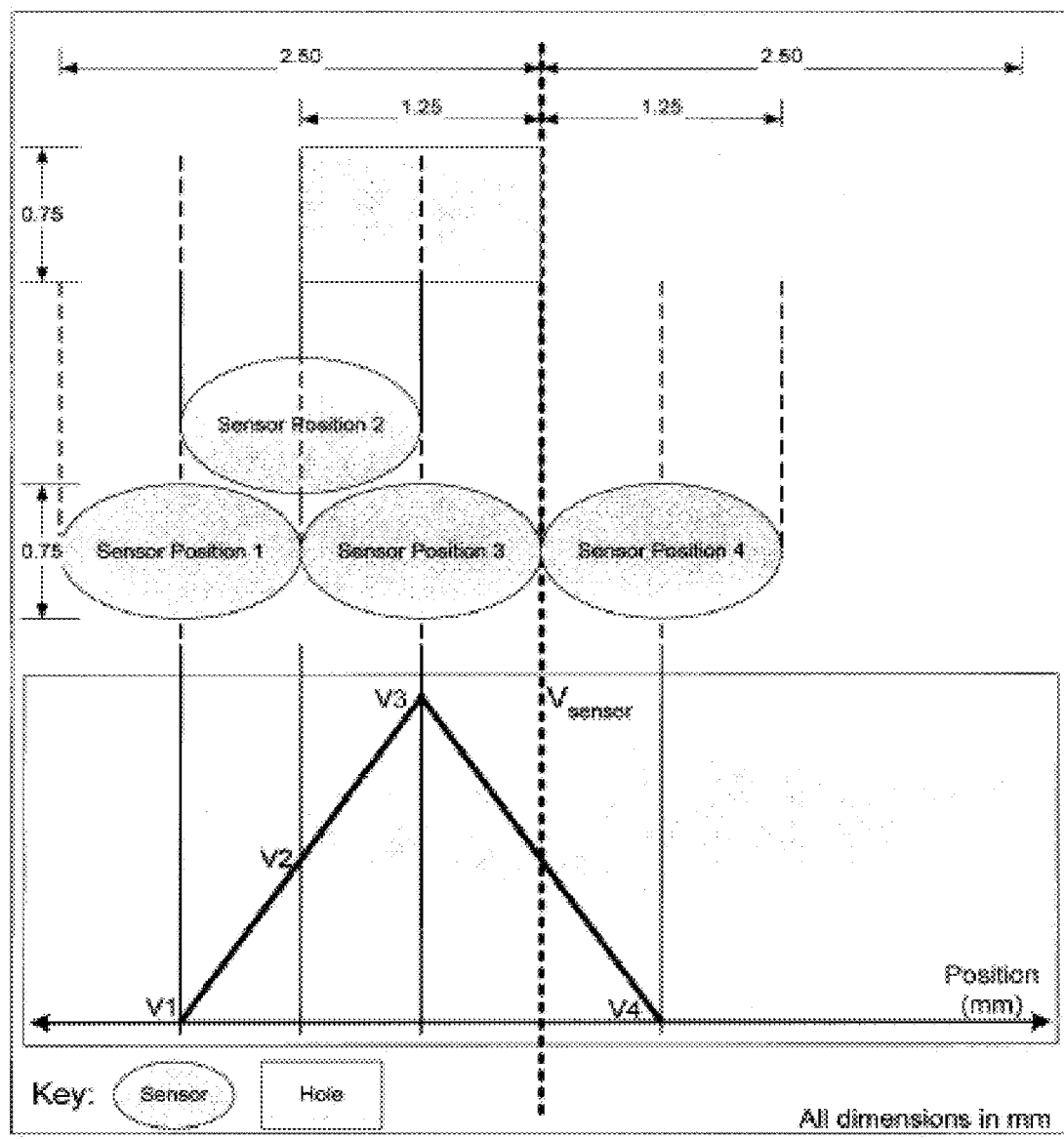
FIG. 8 is a diagram illustrating single sensor voltage as a function of position, in accordance with an embodiment.
Figure 9:
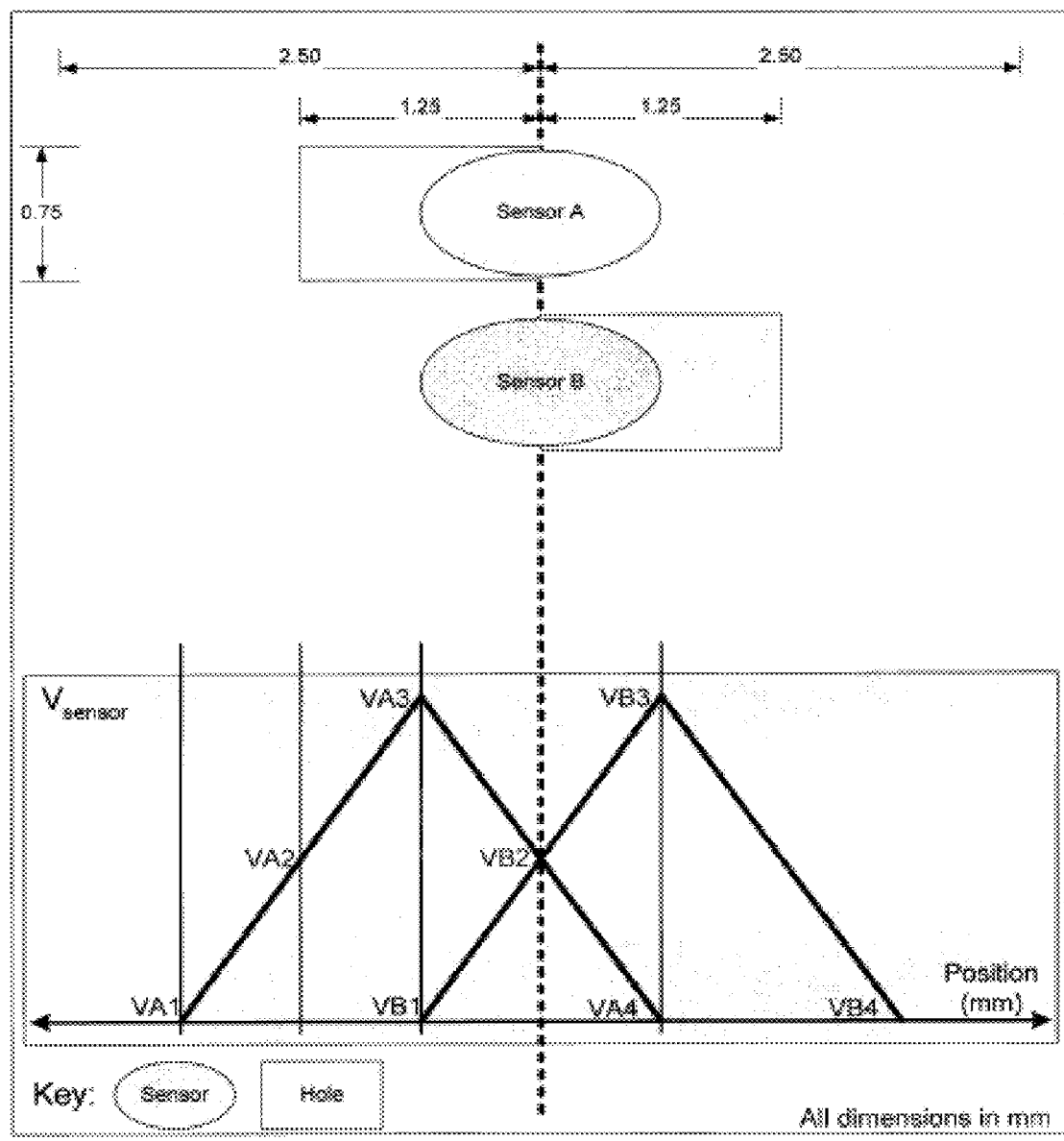
FIG. 9 is a diagram illustrating dual sensor voltages as a function of position, in accordance with an embodiment.

FIG. 8 is a diagram illustrating single sensor voltage as a function of position, in accordance with an embodiment. A sensor can represent a single emitter-detector pair. This diagram provides more detail on the basic operation of a single sensor as a function of position. As the sensor position moves to fully overlap a hole, the sensor signal increases from a minimum of v1 (at sensor position 1 having no overlap with a hole) to a maximum of v3 at sensor position 3. Once the sensor position moves past the hole, the sensor signal decreases to another minimum v4 at sensor position 4 having no overlap with a hole. Positioning is achieved by the use of two sensors (located on the sled) reading two edges of holes (located on encoder panels on the cartridges and drives) as described in the next figure. FIG. 9 is a diagram illustrating dual sensor voltages as a function of position, in accordance with an embodiment. This diagram provides more detail on the basic operation of two sensors in combination as a function of position. Optimal position is achieved by driving the digitized difference between the voltage values of the two sensors to zero. When the sensors are not aligned with the hole edges, the system can adjust the position of the sensors by moving the sled. The direction of motion is determined by whichever sensor returns a greater voltage, and then driving the sled to reduce that voltage to match the other sensor.

Figure 10:
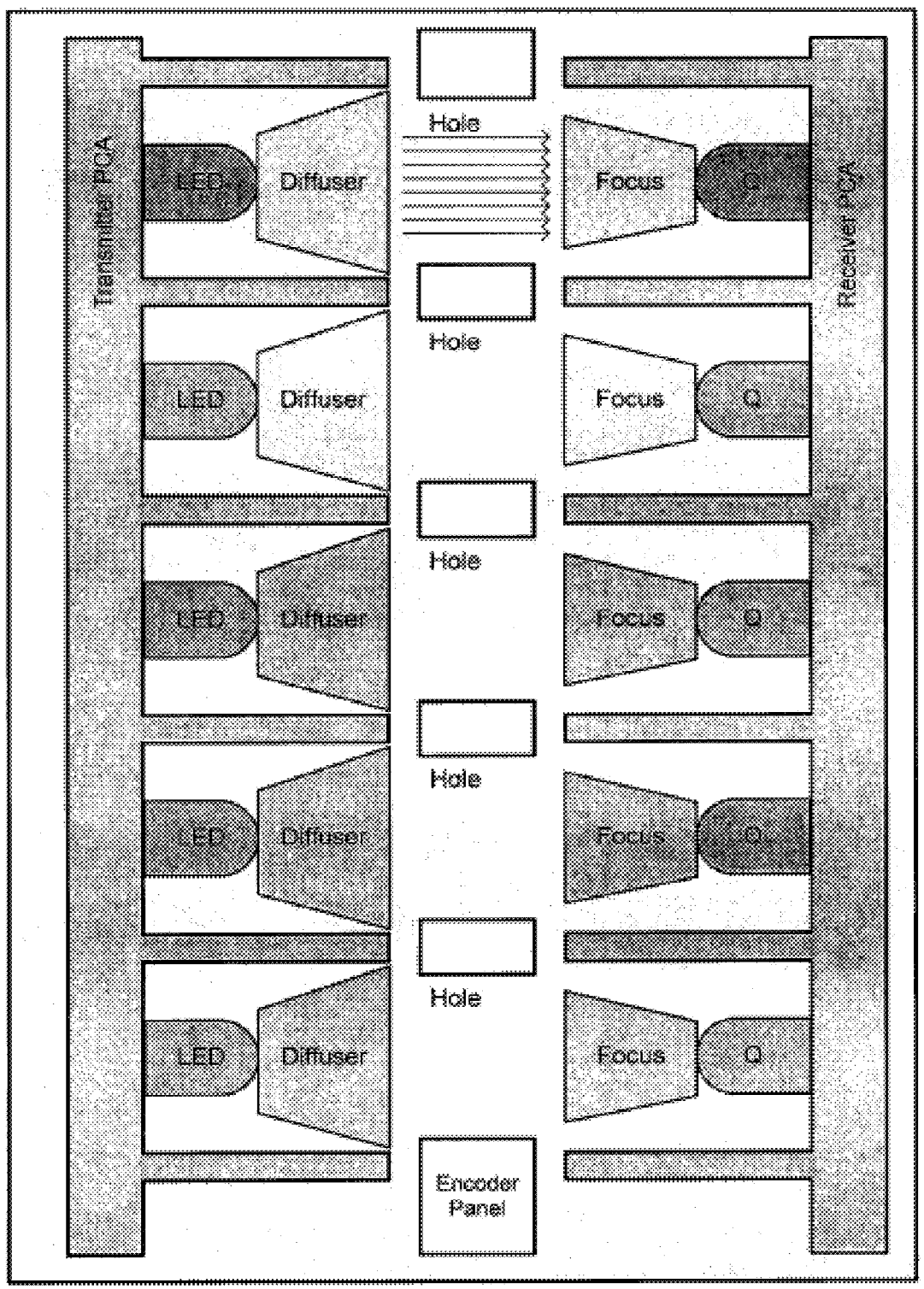
FIG. 10 illustrates a cross-section of encoder panel, transmitter, and receiver PCAs with optics, in accordance with an embodiment.
Figure 11A:
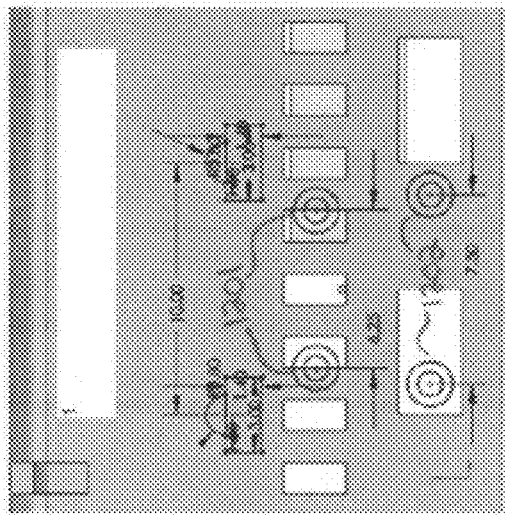
FIGS. 11A-D illustrates a detailed view of an encoder panel, in accordance with an embodiment.
Figure 11B:
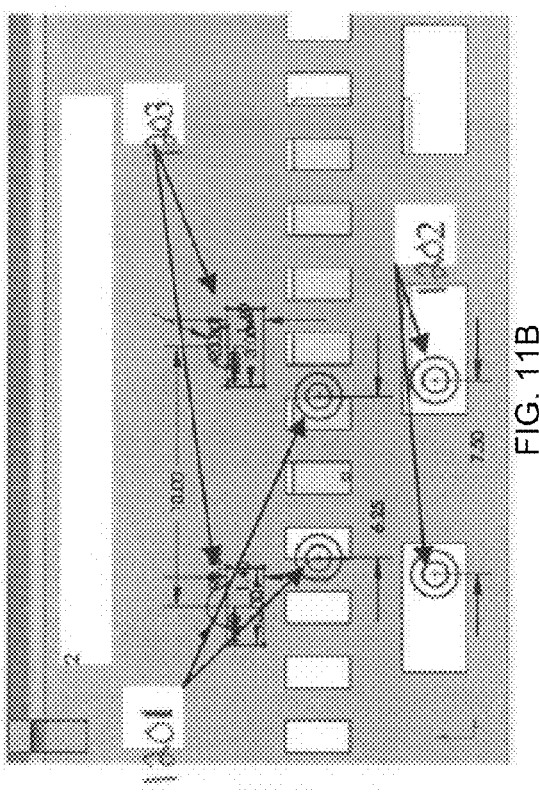
Figure 11C:
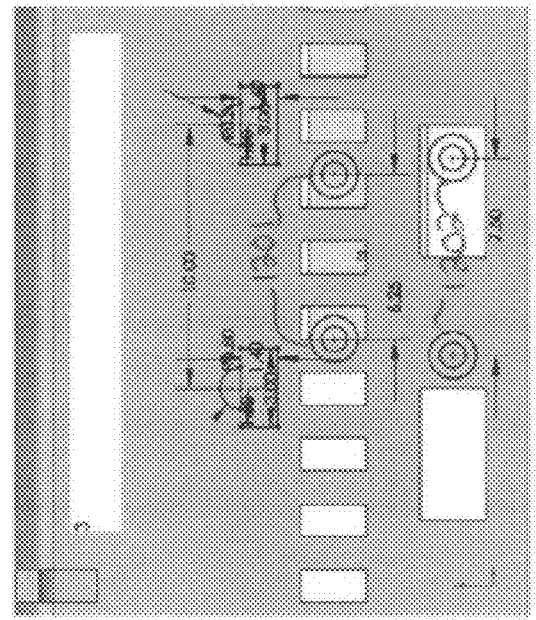
Figure 11D:
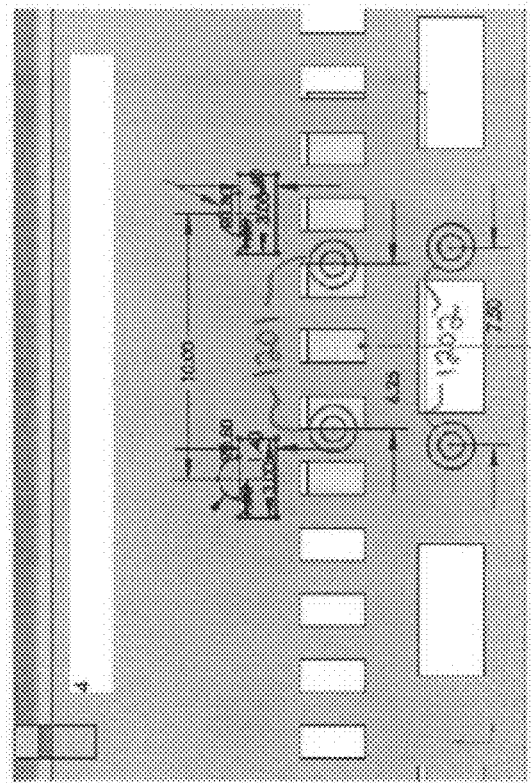

FIG. 10 illustrates a cross-section of encoder panel, transmitter, and receiver PCAs with optics, in accordance with an embodiment. The transmitters and encoder pairs are shown on opposite sides of the encoder. The pattern sizes are chosen to reject most manufacturing and assembly errors. The sensor areas at the end of the focus lenses are smaller than holes such that vertical and horizontal manufacturing defects and assembly errors do not affect the light impinging on sensors. In one embodiment, small apertures over the emitter and/or the receiver can also be used to ensure that nearby sensors do not interfere with each other and still achieve a smaller positioning sensor set for less cost than using optical lenses.

FIGS. 11A-D illustrates a detailed view of an encoder panel, in accordance with an embodiment. Two fine position sensors 1201 are designed to use one encoder panel hole pattern, thus reducing the total area needed for the encoder panel and sensor assemblies. A single row with non-integrally spaced sensor centers meets the requirements of the analog sensor positioning design, but uses half of the space. The same space reduction principle can be applied to the coarse position sensors 1202. One hole row is used for two sensors, reducing the required encoder pattern space. Note that disc present sensors 1203 are also shown in FIGS. 11A-D, but are not relevant to the space reduction technique. Also note that although one arrangement of fine position sensors 1201 and coarse position sensors 1202 are shown, other arrangements can also be used. For example, the relative horizontal positions of sensors 1201 and 1202 and the disc present sensors 1203 can be changed, without having any significant affect on the row-reduction technique.

Other Configuration Considerations

The above description is included to illustrate the operation of the embodiments and is not meant to limit the scope of the disclosure. From the above discussion, many variations will be apparent to one skilled in the relevant art that would yet be encompassed by the spirit and scope as set forth herein. Those of skill in the art will also appreciate other embodiments for the teachings herein. The particular naming of the components, capitalization of terms, the attributes, data structures, or any other programming or structural aspect is not mandatory or significant, and the mechanisms that implement the features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

The methods and operations presented herein are not inherently related to any particular computer or other apparatus. The required structure for a variety of these systems will be apparent to those of skill in the art, along with equivalent variations. In addition, the embodiments are not described with reference to any particular programming language. It is appreciated that a variety of programming languages may be used to implement the teachings as described herein, and any references to specific languages are provided for enablement and best mode of embodiments as disclosed.

Embodiments disclosed are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope.

What is claimed is:

1. A media library appliance comprising:
    an optical disc drive field-replaceable unit comprising two optical drives oriented vertically;
    a disc cartridge housing discs stored in a horizontal stack;
    disc handling robotics comprising a disc picker assembly that slides laterally with respect to the disc cartridge and the optical disc drives to access discs stored in the cartridge to load into the optical drives; and
    a shuttle cartridge that removably attaches to the disc cartridge to import and export a smaller number of discs from the larger disc cartridge.

2. The media library appliance of claim 1, wherein the appliance has a maximum width of 17.5 inches and is rack mountable in a standard 19 inch rack.

3. The media library appliance of claim 1, wherein the shuttle cartridge further comprises shuttle cartridge flash used to carry metadata about discs in the shuttle cartridge.

4. The media library appliance of claim 1, wherein the disc cartridge further comprises cartridge flash used to carry metadata about discs in the cartridge.

5. The media library appliance of claim 1, wherein the disc cartridge is removable from the library, and wherein the media library appliance further comprises a cartridge key rod to lock and unlock the cartridge to the library and to lock discs into the cartridge when the cartridge is removed from the library.

6. The media library appliance of claim 1, wherein the two optical drives oriented vertically in the field-replaceable unit are oriented to read opposite sides of a disc having media on both sides.

7. The media library appliance of claim 1, further comprising another optical disc drive field-replaceable unit comprising two optical drives oriented vertically, wherein the disc handling robotics also load discs into the optical drives of this other optical disc drive field-replaceable unit, and wherein two optical disc drive field-replaceable units are positioned on opposite sides of the disc handling robotics.

8. The media library appliance of claim 1, further comprising another disc cartridge housing discs stored in a horizontal stack, wherein the two disc cartridges are positioned on opposite sides of the disc handling robotics, and wherein the disc handling robotics slide laterally with respect to both disc cartridges to access discs stored in the cartridges to load into the optical drives.

9. The media library appliance of claim 1, wherein the disc handling robotics comprises redundant front and rear disc picker assemblies that slide laterally with respect to the disc cartridge and the optical disc drives to access discs stored in the cartridge to load into the optical drives.

10. The media library appliance of claim 1, further comprising an access door in a housing of the media library appliance that allows access to the optical disc drive field-replaceable unit without requiring the media library appliance to power down.

11. The media library appliance of claim 10, wherein the access door comprises a fan field-replaceable unit.

12. The media library appliance of claim 1, wherein the disc cartridge and the disc handling robotics only contact discs on a disc edge or center hole to avoid damage to areas that store data.

13. The media library appliance of claim 1, wherein the disc cartridge further comprises a spring finger to flag the presence of a disc within a slot of the disc cartridge.

14. The media library appliance of claim 1, wherein the disc handling robotics further comprise a collision sensor module to prevent collision of a moving disc picker assembly with an object in the disc picker assembly's path.

15. The media library appliance of claim 1, further comprising a disc detection system comprising an arc array of phototransistors opposite an arc array of LED transmitters to sense a disc edge.

16. The media library appliance of claim 15, wherein the disc detection system further comprises a linear array of phototransistors opposite a linear array of LED transmitters to sense a gross disc location.

17. The media library appliance of claim 1, further comprising a disc picker assembly that operates on a closed-loop control signal based on outputs from two sensors.

* * * * *